United States Patent [19]
TenBrook et al.

[11] Patent Number: 5,999,815
[45] Date of Patent: Dec. 7, 1999

[54] METHOD AND APPARATUS FOR IMPLEMENTING DIVERSITY FOR A DUAL-MODE COMMUNICATION UNIT

[75] Inventors: Keith A. TenBrook, Cary; Daniel Joseph DeClerck, Algonquin, both of Ill.

[73] Assignee: Motorola, Inc., Schaumburg, Ill.

[21] Appl. No.: 09/111,974

[22] Filed: Jul. 8, 1998

[51] Int. Cl.⁶ .................................................. H04Q 7/00
[52] U.S. Cl. ............................ 455/436; 455/426; 455/553
[58] Field of Search ...................... 455/422, 426, 455/436, 437, 438, 440, 442, 445, 458, 550, 552, 553

[56] References Cited

U.S. PATENT DOCUMENTS

| | | | |
|---|---|---|---|
| 5,737,703 | 4/1998 | Byrne | 455/436 |
| 5,887,260 | 3/1999 | Nakata | 455/436 |
| 5,930,712 | 7/1999 | Byrne et al. | 455/436 |

*Primary Examiner*—Thanh Cong Le
*Attorney, Agent, or Firm*—Sayed Hossain Beladi

[57] ABSTRACT

The present invention provides a method for implementing diversity for a dual-mode communication unit in a communication system. The communication system includes a first transceiver utilizing a first air interface and a second transceiver utilizing a second air interface distinct from the first air interface. The system also includes a controller that includes a selector function. The dual-mode communication unit transmits a first copy of bearer data to the first transceiver utilizing the first air interface. The dual-mode communication unit transmits a second copy of the bearer data to the second transceiver utilizing the second air interface. The first transceiver and the second transceiver sending the copy of the bearer data to the controller. The first transceiver and the second transceiver also send a quality metric to the controller. The controller selects a preferred copy of the bearer data based at least in part upon the quality metrics.

17 Claims, 2 Drawing Sheets

METHOD AND APPARATUS FOR IMPLEMENTING DIVERSITY FOR A DUAL-MODE COMMUNICATION UNIT

FIELD OF THE INVENTION

The invention relates generally to wireless communication systems and more particularly to diversity in such wireless communication systems.

BACKGROUND OF THE INVENTION

Cellular communication systems are well known. As cellular communication systems evolve, communication systems with dissimilar air-interfaces likewise evolve. For example, one communication system which has evolved from the well known IS-95A system is a communication system commonly referred to as CDMA 2000. In the CDMA 2000 communication system, layer 2 and above messaging/signaling can be compatible with the IS-95A communication; however, the air-interface is different between the communication systems. The differences between the air-interface include, inter alia, channel bandwidth, type of modulation, channel structures, power control and coding gain on the physical link. Such differences between the air-interfaces of these communication systems presents problems when a dual-mode communication unit compatible with both communication requires a handoff between diverse communication systems.

Thus, a need exists for a method and apparatus which overcomes the deficiencies of the prior art.

DETAILED DESCRIPTION OF A PREFERRED EMBODIMENT

Figure 1:
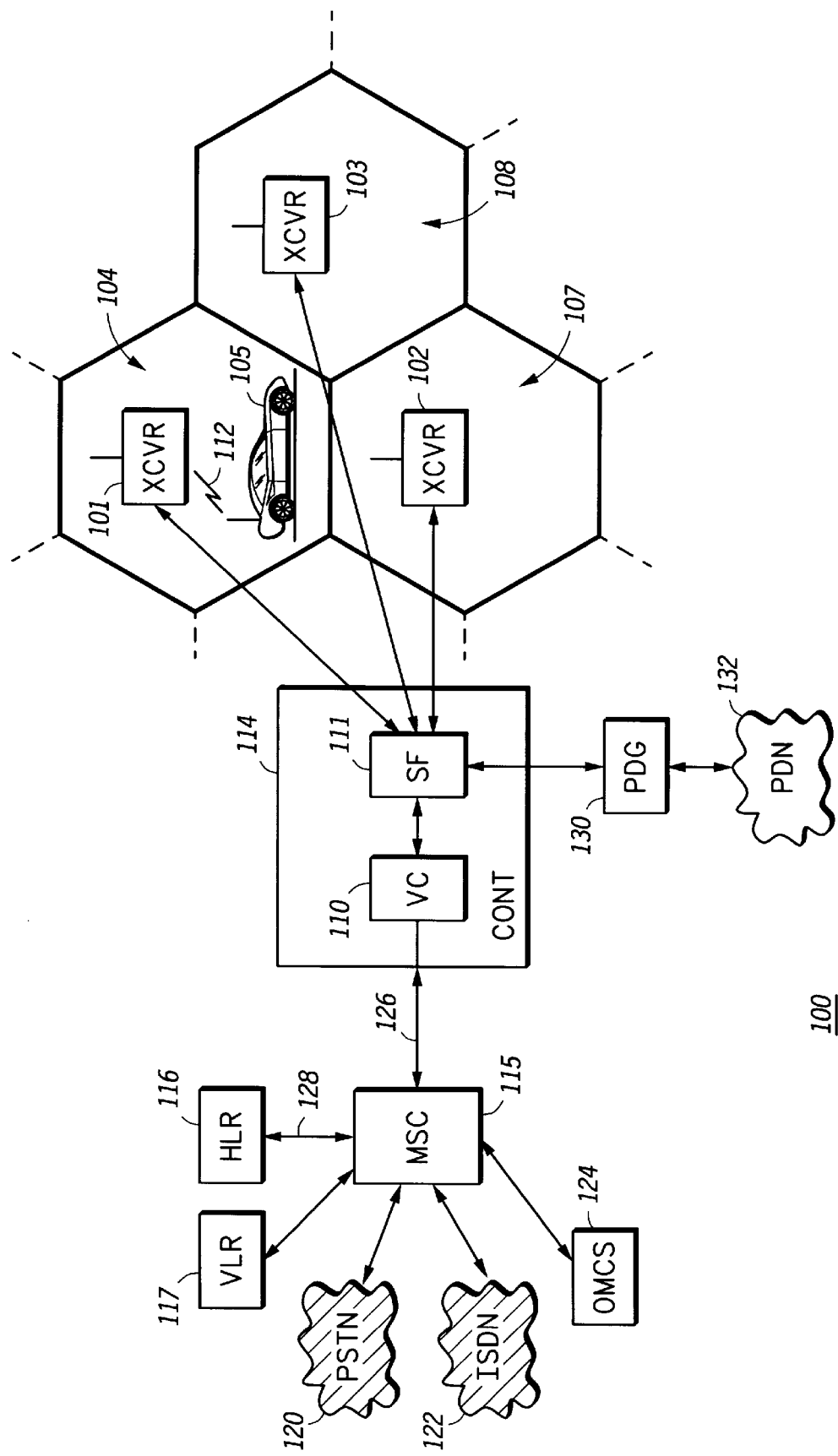
FIG. 1 generally depicts a wireless communication system for implementing diversity in communication systems having dissimilar air-interfaces in accordance with the invention.

FIG. 1 generally depicts a wireless communication system for implementing diversity for a dual-mode communication unit between systems having dissimilar air-interfaces in accordance with the preferred embodiment of the present invention. In the preferred embodiment, the wireless communication system is a CDMA communication system 100 which is compatible with TIA/EIA/IS-95A/B, *Mobile Station-Base-station Compatibility Standard for Dual Mode Wideband Spread Spectrum Cellular System*, March 1995, published by the Electronic Industries Association (EIA), 2001 Eye Street, N.W., Washington, D.C. 20006. Such a CDMA communication system 100 is substantially well known in the art.

Figure 2:
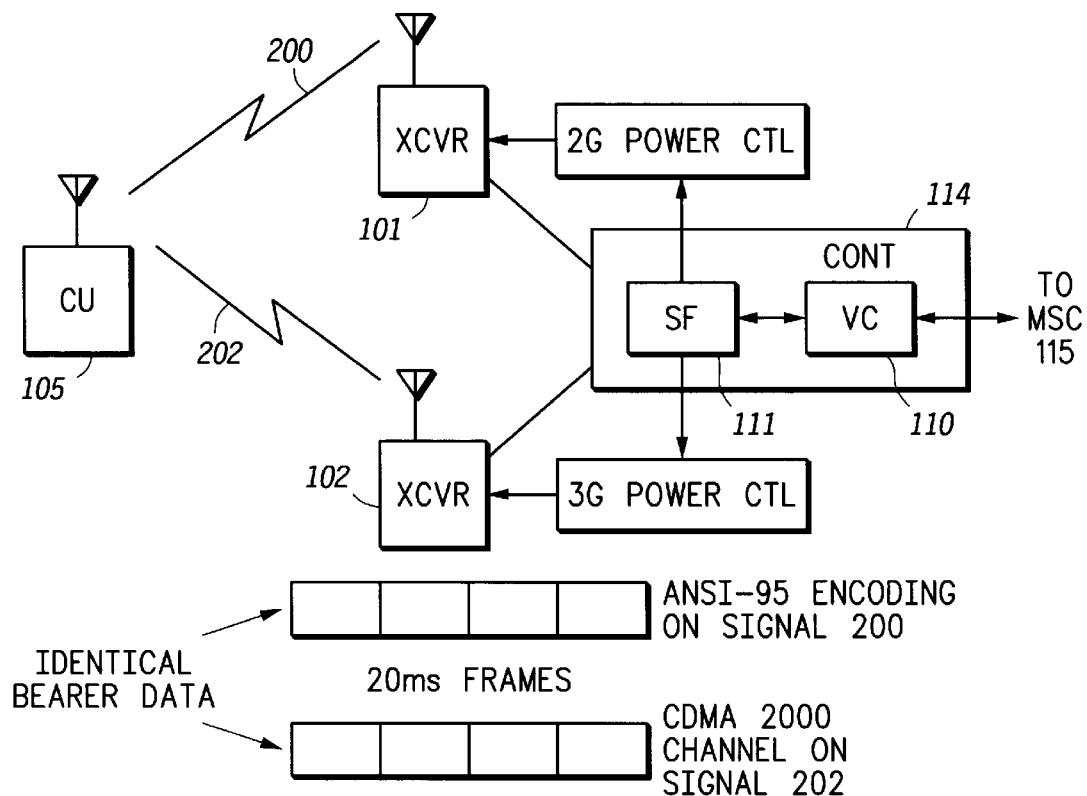
FIG. 2 generally depicts elements of FIG. 1 in greater detail in accordance with the invention.
Figure 3:
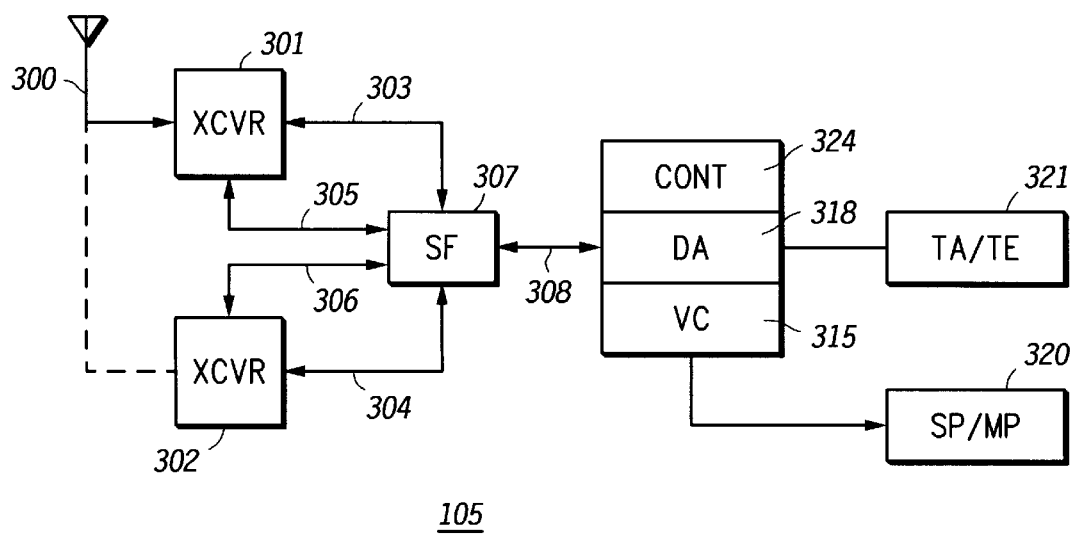
FIG. 3 generally depicts a block diagram of a dual-mode communication unit in accordance with the invention.

The following is a list of definitions for the acronyms used in FIGS. 1–3:

| | |
|---|---|
| CONT | Base Station Controller |
| CU | Communication Unit |
| DA | Data Application |
| HLR | Home Location Register |
| ISDN | Integrated Services Digital Network |
| MSC | Mobile Switching Center |
| OMCS | Operations and Maintenance Center - Switch |
| PDG | Packet Data Gateway |
| PDN | Packet Data Network |
| PSTN | Public Switched Telephone Network |
| SF | Selector Function |
| SP/MP | Speaker/Microphone |
| TA/TE | Terminal Adapter/Terminal Equipment |
| VC | Vocoder |
| VLR | Visitor Location Register |
| XCVR | Transceiver |

As shown in FIG. 1, a first XCVR 101 is located in a first coverage area 104 and communicates with a communication unit 105. In the preferred embodiment, communication unit 105 is a mobile communication unit, however communication unit 105 could equally be a fixed communication unit. Communication is via a digital radio channel 112 which contains data information compatible with a CDMA communication system as defined in IS-95A/B. As stated above, the communication station 105 is compatible with TIA/EIA/IS-95A/B, *Mobile Station-Base-station Compatibility Standard for Dual Mode Wideband Spread Spectrum Cellular System*, March 1995, published by the Electronic Industries Association (EIA), 2001 Eye Street, N.W., Washington, D.C. 20006.

Also included in FIG. 1 are XCVRs 102–103 located within corresponding coverage areas 107–108. As shown in FIG. 1, XCVRs 102–103 are compatible with the above cited CDMA 2000 communication system. For more information on CDMA 2000, see Telecommunications Industry Association (TIA) TR45.5, *The cdma2000 ITU-R RTT Candidate Submission*, approved May 15, 1998.

Continuing, each base station 101–103 is coupled to a base station controller (CONT) 114 which includes a VC 110 and a SF 111 in accordance with the invention. While VC 110 and SF 111 are shown in CONT 114, it should be clear to one skilled in the art that the functionality of VC 110 and SF 111 could be located elsewhere depending on the particular system configuration. As is clear from FIG. 1, SF 111 performs selection functions (as described hereinafter) related to usability of bearer data while VC 110 performs vocoding functions. The speech/data information is routed to MSC 115 which provides switching functions for access to PSTN 120 or ISDN 122. For packet switched data, SF 111 appropriately routes the packet switched data to PDG 130 for eventual transfer to PDN 132. Link 126 between CONT 114 and MSC 115 is an A+ interface which is well known in the art.

HLR 116 and VLR 117 provide location and billing services for the entire system as is also well known in the art, while the OMCS 124 provides diagnostics and maintenance services for the system as is also well known in the art. In the preferred embodiment, link 128 between MSC 115/HLR 116 is a IS-41 compatible link which is well known in the art. As one skilled in the art will appreciate, the concepts described herein in accordance with the invention can be equally implemented in the Groupe Special Mobile (GSM) digital wireless communication system as well. In this embodiment, links 126 and 128 are an A interface and MAP protocol which are each well known in the art.

In the preferred embodiment, communication unit 105 is a dual-mode communication unit compatible with both the IS-95A XCVR 101 and the CDMA 2000 XCVRs 102–103. Stated differently, communication unit 105 is capable of communicating with either XCVR 101 or XCVRs 102–103.

FIG. 2 generally depicts elements of FIG. 1 in greater detail in accordance with the invention. As shown in FIG. 2, dual-mode communication unit 105 is in communication with both XCVR 101 via signal 200 compatible with the IS-95A air-interface and XCVR 102 via signal 202 compatible with the CDMA 2000 air-interface in accordance with the invention. This common communication with dual-mode communication unit 105 is known as soft-handoff, which is triggered using techniques which are well known in the art.

In the embodiment shown in FIG. 2, the key to implementing handoff between communication systems having dissimilar air-interfaces in accordance with the invention is that identical bearer data is transferred via signals 200 and 202 to and from dual-mode communication unit 105. In the preferred embodiment, the bearer data includes vocoded speech, user data and signaling data. As shown in FIG. 2, the identical bearer data transferred via signals 200 and 202 is configured in frames having a time duration of 20 milliseconds (ms). One skilled in the art will appreciate that the identical bearer data could be transferred via signals 200 and 202 to/from dual-mode communication unit 105 using any framing structure, even when the framing structures are dissimilar. Also in the preferred embodiment, the identical bearer data transferred via signals 200 and 202 is vocoded by a common vocoder (such as VC 110). Dual-mode communication unit 105 also includes a vocoder as is well known in the art. The identical bearer data transferred via signals 200 and 202 can likewise be vocoded by different types of vocoders (for example, one type for each dissimilar air-interface) depending on the particular system and/or dual-mode communication unit 105 configuration.

XCVR 101 utilizes a first air-interface, which in the preferred embodiment is an air-interface compatible with IS-95A. XCVR 102 utilizes a second air-interface, which in the preferred embodiment is an air-interface compatible with CDMA 2000. CONT 114 includes SF 111. In accordance with the invention, a first reverse copy of bearer data is transmitted from dual-mode communication unit 105 to XCVR 101 via the IS-95A air-interface and a second reverse copy of the bearer data is transmitted from the dual-mode communication unit 105 to XCVR 102. The first reverse copy of the bearer data from XCVR 101 is then sent to CONT 114 as is the second reverse copy of the bearer data from XCVR 102. Also, a first reverse quality metric from XCVR 101 is sent to CONT 114 as is a second reverse quality metric from XCVR 102. The SF 111 within CONT 114 then selects a preferred reverse copy of the bearer data from the first reverse copy of the bearer data and the second reverse copy of the bearer data based at least in part upon the first reverse quality metric and second reverse quality metric in accordance with the present invention.

In the preferred embodiment, the power output of dual-mode communication unit 105 is controlled based at least in part upon the first reverse quality metric, preferably at XCVR 101. The power output of dual-mode communication unit 105 could also be beneficially controlled based at least in part upon the second reverse quality metric, preferably at XCVR 102. In this embodiment, a first forward quality metric is determined at dual-mode communication unit 105 based at least in part upon the first forward copy of bearer data. Also, a second forward quality metric is also determined at dual-mode communication unit 105 based at least in part upon the second forward copy of bearer data. The preferred copy of the bearer data is selected from the first forward copy of the bearer data and the second forward copy of the bearer data based at least in part upon the first forward quality metric and second forward quality metric.

FIG. 3 generally depicts a block diagram of dual-mode communication unit 105 in accordance with the invention. As shown as FIG. 3, antenna 300 receives signals 200 and 202 and provides a received signal to XCVR 300 and 303. In the preferred embodiment, only a single antenna 300 is shown, however multiple (separate) antennas could provide received signals to XCVR 301 and XCVR 302 as one skilled in the art will appreciate. In the preferred embodiment, XCVR 301 is compatible with IS-95A while XCVR 302 is compatible with CDMA 2000.

Output from XCVR 301 is a signal 303 which includes the bearer data associated with signal 200 while XCVR 302 outputs a signal 304 which includes the bearer data associated with signal 202. Signals 303–304 are input into SF 307 which selects which copy of bearer data to utilize for the particular frame of information received. XCVR 301 also outputs a first quality metric 305 which represents, inter alia, bit error rate (BER), signal power, and symbol error rate (SER) corresponding to signal 200, while XCVR 302 outputs a second quality metric 306 which represents, inter alia, bit error rate (BER), signal power, and symbol error rate (SER) corresponding to signal 202. Quality metrics 305–306 are input into SF 307, which then selects a preferred forward copy of the bearer data from the first forward copy of the bearer data and the second forward copy of the bearer data based at least in part upon the first forward quality metric and second forward quality metric in accordance with the invention.

Upon selection of the preferred forward copy of the bearer data, SF 307 outputs the preferred copy of the bearer data to either VC 315, DA 318, or CONT 324, depending on the type of signal/call. For example, if the type of signal/call is a speech call, the preferred copy of the bearer data is routed to VC 315 where the signal is eventually routed to SP/MP 320 for use by the end user. If the type of signal/call is a data call (for a example, a download of data from a computer), the preferred copy of the bearer data is routed to DA 318 where the signal is eventually routed to TA/TE 321. If the type of signal/call is signaling information, the preferred copy of the bearer data is routed to CONT 324, where the signal is processed by the CONT 324.

While this invention has been described in terms of certain examples thereof, it is not intended that it be limited to the above description, but rather only to the extent set forth in the claims that follow.

We claim:

1. A method for implementing diversity for a dual-mode communication unit in a communication system, the communication system including a first transceiver utilizing a first air interface, a second transceiver utilizing a second air interface distinct from the first air interface, and a controller that includes a selector function, the method comprising the steps of:

transmitting a first copy of bearer data from the dual-mode communication unit to the first transceiver utilizing the first air interface;

transmitting a second copy of the bearer data from the dual-mode communication unit to the second transceiver utilizing the second air interface;

sending the first copy of the bearer data from the first transceiver to the controller;

sending a first quality metric from the first transceiver to the controller;

sending the second copy of the bearer data from the second transceiver to the controller;

sending a second quality metric from the second transceiver to the controller; and selecting a preferred copy of the bearer data from the first copy of the bearer data and the second copy of the bearer data based at least in part upon the first quality metric and the second quality metric.

2. A method for implementing diversity for a dual-mode communication unit in a communication system in accordance with claim 1, further comprising the step of performing soft handoff of the dual-mode communication unit from the first transceiver to the second transceiver.

3. A method for implementing diversity for a dual-mode communication unit in a communication system in accordance with claim 2, wherein the step of performing soft handoff comprises the step of ceasing transmission of subsequent bearer data from the dual-mode communication unit to the first transceiver.

4. A method for implementing diversity for a dual-mode communication unit in a communication system in accordance with claim 1, further comprising the step of controlling the power output of the communication unit based at least in part upon the first quality metric.

5. A method for implementing diversity for a dual-mode communication unit in a communication system in accordance with claim 4, wherein the step of controlling the power output of the communication unit is performed at the first transceiver.

6. A method for implementing diversity for a dual-mode communication unit in a communication system in accordance with claim 1, further comprising the step of controlling the power output of the communication unit based at least in part upon the second quality metric.

7. A method for implementing diversity for a dual-mode communication unit in a communication system in accordance with claim 6, wherein the step of controlling the power output of the communication unit is performed at the second transceiver.

8. A method for implementing diversity for a dual-mode communication unit in a communication system, the communication system including a first transceiver utilizing a first air interface, a second transceiver utilizing a second air interface distinct from the first air interface, and a controller that includes a selector function, the method comprising the steps of:

sending a first copy of bearer data from the controller to the first transceiver;

sending a second copy of the bearer data from the controller to the second transceiver;

transmitting the first copy of the bearer data from the first transceiver to the dual-mode communication unit utilizing the first air interface;

determining a first quality metric at the dual-mode communication unit based at least in part upon the first copy of bearer data; and transmitting the second copy of the bearer data from the second transceiver to the dual-mode communication unit utilizing the second air interface;

determining a second quality metric at the dual-mode communication unit based at least in part upon the second copy of bearer data; and selecting a preferred copy of the bearer data from the first copy of the bearer data and the second copy of the bearer data based at least in part upon the first quality metric and the second quality metric.

9. A method for implementing diversity for a dual-mode communication unit in a communication system in accordance with claim 8, further comprising the step of performing soft handoff of the dual-mode communication unit from the first transceiver to the second transceiver.

10. A method for implementing diversity for a dual-mode communication unit in a communication system in accordance with claim 9, wherein the step of performing soft handoff comprises the step of ceasing transmission of subsequent bearer data from the first transceiver to the dual-mode communication unit.

11. A method for implementing diversity for a dual-mode communication unit in a communication system in accordance with claim 8, further comprising the step of controlling the power output of the communication unit based at least in part upon the first quality metric.

12. A method for implementing diversity for a dual-mode communication unit in a communication system in accordance with claim 11, wherein the step of controlling the power output of the communication unit is performed at the first transceiver.

13. A method for implementing diversity for a dual-mode communication unit in a communication system in accordance with claim 8, further comprising the step of controlling the power output of the communication unit based at least in part upon the second quality metric.

14. A method for implementing diversity for a dual-mode communication unit in a communication system in accordance with claim 13, wherein the step of controlling the power output of the communication unit is performed at the second transceiver.

15. A communication system for implementing diversity between systems having dissimilar air interfaces, the communication system comprising:

a first transceiver utilizing a first air interface;

a second transceiver utilizing a second air interface distinct from the first air interface;

a dual-mode communication unit in communication with the first transceiver and the second transceiver, the dual-mode communication unit effective to transmit a first reverse copy of bearer data to the first transceiver utilizing the first air interface and to transmit a second reverse copy of the bearer data to the second transceiver utilizing the second air interface; and a controller including a selector function for selecting a preferred reverse copy of the bearer data from the first reverse copy of the bearer data and the second reverse copy of the bearer data based at least in part upon a first reverse quality metric and a second reverse quality metric.

16. A communication system for implementing diversity between systems having dissimilar air interfaces in accordance with claim 15, wherein the first transceiver and the second transceiver are located in a base transceiver station.

17. A dual-mode communication unit for implementing diversity in a communication system, the dual-mode communication unit comprising:

a transmitter effective to transmit a first reverse copy of bearer data utilizing a first air interface and to transmit a second reverse copy of the bearer data utilizing a second air interface;

a receiver for receiving a first forward copy of bearer data and a second forward copy of the bearer data;

a processor for determining a first forward quality metric based at least in part upon the first forward copy of bearer data and a second forward quality metric based at least in part upon the second forward copy of bearer data; and a selector effective to select a preferred copy of the bearer data from the first forward copy of the bearer data and the second forward copy of the bearer data based at least in part upon the first forward quality metric and second forward quality metric.

* * * * *